(12) United States Patent
Soderqvist

(10) Patent No.: US 11,446,577 B2
(45) Date of Patent: Sep. 20, 2022

(54) COMPUTER DEVICE CONFIGURED TO PROVIDE A COMPUTER IMPLEMENTED GAME AND METHOD

(71) Applicant: KING.COM LIMITED, St. Julians (MT)

(72) Inventor: Michael Soderqvist, Stockholm (SE)

(73) Assignee: KING.COM LTD., St. Julians (MT)

(*) Notice: Subject to any disclaimer, the term of this patent is extended or adjusted under 35 U.S.C. 154(b) by 0 days.

(21) Appl. No.: 17/140,524

(22) Filed: Jan. 4, 2021

(65) Prior Publication Data
US 2022/0212105 A1 Jul. 7, 2022

(51) Int. Cl.
*A63F 13/537* (2014.01)

(52) U.S. Cl.
CPC .................... *A63F 13/537* (2014.09)

(58) Field of Classification Search
CPC .. G07F 17/326; G07F 17/3213; A63F 13/537; A63F 13/92
See application file for complete search history.

(56) References Cited

U.S. PATENT DOCUMENTS

| | | | |
|---|---|---|---|
| 10,296,188 B2* | 5/2019 | Kodisoja | A63F 13/822 |
| 2014/0080560 A1* | 3/2014 | Knutsson | A63F 13/46 463/10 |
| 2014/0235306 A1* | 8/2014 | Walls | A63F 13/45 463/9 |
| 2015/0154831 A1* | 6/2015 | Arnone | G07F 17/3267 463/9 |

OTHER PUBLICATIONS

IDarwich, "Match Masters—PvP Match 3 Puzzle Game—Gameplay (iOS—Android)", youtube.com, at https://www.youtube.com/watch?v=21XVDgzE3Rg (last visited Jan. 6, 2022). (Year: 2019).*

Elton Jones, "Frozen Free Fall: Top 10 Tips & Cheats You Need to Know", Heavy.com, at https://heavy.com/games/2014/05/frozen-free-fall-tips-tricks-cheats-levels-ios-android-mobile-games (last visited Jan. 6, 2022). (Year: 2014).*

* cited by examiner

*Primary Examiner* — Steve Rowland
(74) *Attorney, Agent, or Firm* — Saul Ewing Arnstein & Lehr LLP

(57) ABSTRACT

A computer device is configured to provide a computer implemented game. A display of the computer device displays game elements on a game board. First and second types of game elements are provided. The second type of game elements are associated with an effect which when triggered causes an interaction with other game elements on the game board. At least one processor of the computer device determines that a plurality of game elements satisfy a match condition and that a first game element of the second type is triggered to provide the effect. When the first game element of the second type has been triggered a plurality of times, it is removed from the game board.

21 Claims, 14 Drawing Sheets

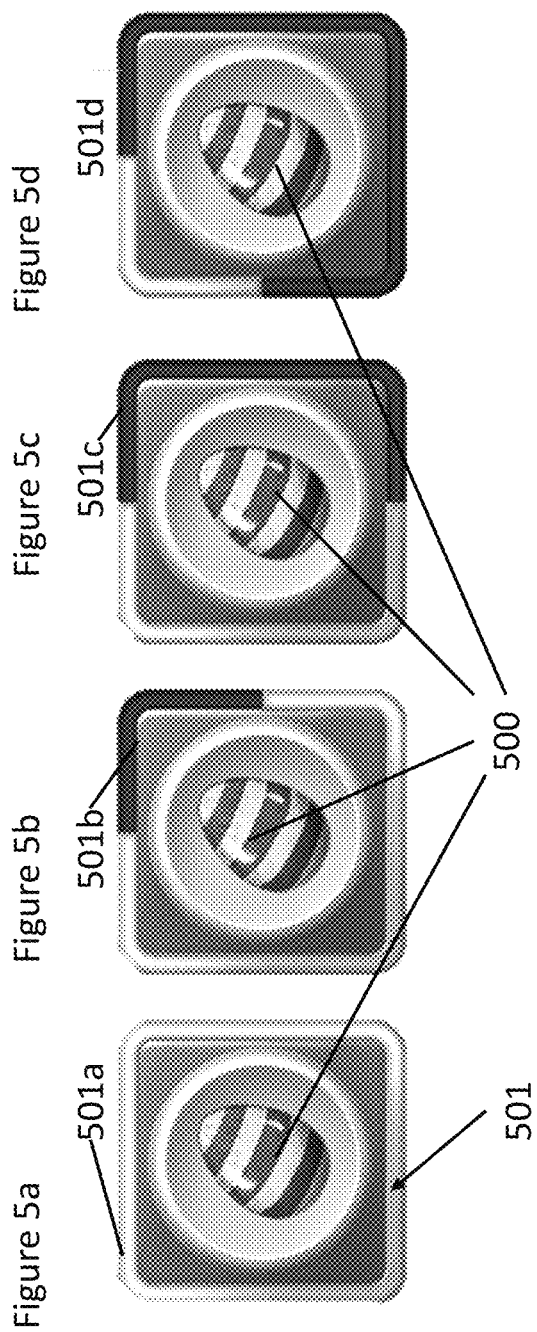

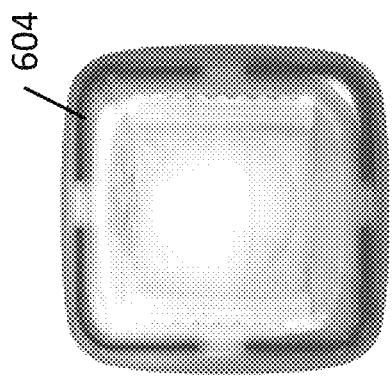
Figure 6e
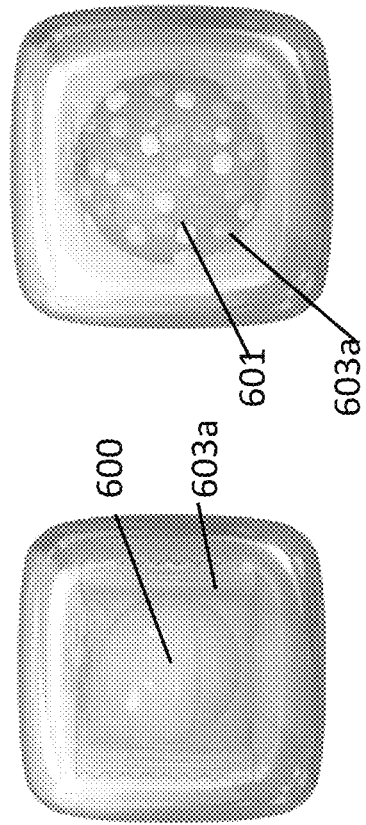
Figure 6b
Figure 6a
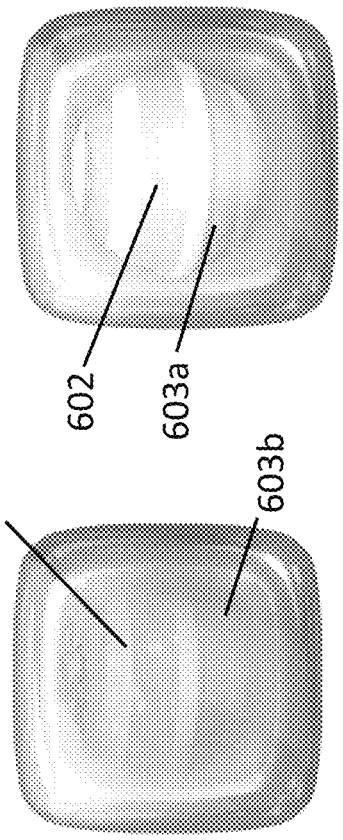
Figure 6d
Figure 6c

COMPUTER DEVICE CONFIGURED TO PROVIDE A COMPUTER IMPLEMENTED GAME AND METHOD

FIELD OF THE INVENTION

Embodiments of this application relate to a user device for use in playing a computer implemented game.

Some embodiments may relate to engaging users or players in a computer game executable in an online environment.

The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how, for example, the user interface is to be controlled in the context of computer devices available to play the game.

One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear.

An existing type of match-three game is a so-called "switcher" game. In a switcher game, the player switches the place of two adjacent game elements on the game board so that one or both of them create a chain of at least three adjacent game elements of the same type. Those matched game elements will then disappear. The game board is then repopulated with game elements.

One such known match three-type switcher game is known by the trademark Candy Crush Saga. In that game, the game board is repopulated or replenished with game elements, for example, falling downwards onto the game board from the top edge of the screen from which the game is played. Other switcher games may refill from other directions.

Another known type of game is "linker game", where a sequence of game elements sharing a matching characteristic are linked and removed from the game board.

Another example are the so called 'clicker' games where the player can click on a group of adjacent game elements of a certain type and those game element will then be removed. Some clicker games only require two adjacent elements to remove those elements if clicked by the user. Others may require more than two. To play the game, the user will, via a user interface, click on any group of two or more touching blocks satisfying a criteria. The criteria may be that the blocks share a matching characteristic. New blocks may or may not appear on the game board. The remaining game element blocks may drop down to fill gaps on the game board.

This patent specification describes not only various ideas and functions, but also their creative expression. A portion of the disclosure of this patent document therefore contains material to which a claim for copyright is made and notice is hereby given: Copyright King.com Limited 2021 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device configured to provide a computer implemented game, the computer device comprising: a display configured to display game elements on a game board of the computer implemented game, the game elements comprising a first type of game elements and a second type of game elements, each game element of the second type of game elements being associated with an effect which when triggered causes an interaction with at least one other game element on the game board, at least some of the game elements being associated with a respective matching characteristic; a user interface configured to receive user input when the user engages with a game element when playing the computer implemented game; and at least one processor configured to: determine, in response to the received user input, that a plurality of game elements having at least one common matching characteristic satisfy a match condition and that a first game element of the second type is triggered to provide the effect; determine that the first game element of the second type has been triggered a plurality of times, and in response causing the game board to be updated such that the first game element of the second type is removed from the game board; and causing the display to display the updated game board.

The user interface may be configured to receive a plurality of user inputs, each user input engaging with a game element to provide a respective move of the computer implemented game, and the at least one processor may be configured to control a respective game element of the second type to be triggered only once in a respective move of the computer implemented game.

The at least one processor may be configured to determine that a respective game element of the second type has been triggered in response to determining that a plurality of game elements having at least one common matching characteristic satisfy a match condition and one or more of the plurality of game elements is adjacent to the respective game element of the second type.

The at least one processor may be configured to determine that a respective game element of the second type has been triggered by an interaction caused by a triggering of another game element of the second type.

The at least one processor may be configured to cause one or more of the game elements of the second type to be displayed on the display with a visual indication indicating that the respective game element is of the second type.

The at least one processor may be configured to cause one or more of the game elements of the second type to be displayed on the display with a visual indication to indicate a number of times the respective game element of the second type has been triggered.

The at least one processor may be configured to cause one or more of the game element of the second type with a visual indication to indicate a remaining number of times the respective game element of the second type can be triggered.

The at least one processor may be configured to update a count value associated with a respective game element of the second type when that respective game element has been triggered.

The at least one processor may be configured to compare the updated count value to a threshold value to determine when a respective game element of the first type has been triggered the plurality of times.

One or more of the game elements of the second type may be provided with a fixed position on the game board.

In some embodiments, the at least one processor may be configured to move a respective game element of the second type from one position of a subset of positions to another position of the subset of positions.

The at least one processor may be configured to move a respective game element of the second type from one position of a subset of positions to another position of the subset of positions when a predefined condition is met.

The predefined condition may be determined to be met each time the user makes a move.

The at least one processor may be configured to determine, when a respective game element of the second type has been triggered, which one or more other game elements are interacted with as a result of the triggering and determine a respective interaction for the one or more other game elements.

The at least one processor may be configured to determine which one or more other game elements are interacted with in dependence on one or more booster characteristics of the respective game element of the second type.

The at least one processor may be configured to determine which one or more other game elements are interacted with in dependence on one or more booster characteristics of the respective game element of the second type and one or more properties of the one or more other game elements.

The at least one processor may be configured to cause one or more of the plurality of game elements having the at least one common matching characteristic to be removed from the game board and to cause the game board to be replenished with one or more game elements.

According to another aspect, there is provided a computer implemented method provided by a computer device configured to provide a computer implemented game, the method comprising: displaying, on a display of the computer device, game elements on a game board of the computer implemented game, the game elements comprising a first type of game elements and a second type of game elements, each game element of the second type of game elements being associated with an effect which when triggered causes an interaction with at least one other game element on the game board, at least some of the game elements being associated with a respective matching characteristic; receiving, by a user interface of the computer device, user input when the user engages with a game element when playing the computer implemented game; determining, by at least one processor of the computer device, in response to the received user input that a plurality of game elements having at least one common matching characteristic satisfy a match condition and that a first game element of the second type is triggered to provide the effect; determining, by the at least one processor, that the first game element of the second type has been triggered a plurality of times, and in response causing the game board to be updated such that the first game element of the second type is removed from the game board; and causing, by the at least one processor, the display to display the updated game board.

The method may comprise receiving, by the user interface, a plurality of user inputs, each user input engaging with a game element to provide a respective move of the computer implemented game, and controlling, by the at least one processor, a respective game element of the second type to be triggered only once in a respective move of the computer implemented game.

The method may comprise determining, by the at least one processor, that a respective game element of the second type has been triggered in response to determining that a plurality of game elements having at least one common matching characteristic satisfy a match condition and one or more of the plurality of game elements is adjacent to the respective game element of the second type.

The method may comprise determining, by the at least one processor, that a respective game element of the second type has been triggered by an interaction caused by a triggering of another game element of the second type.

The method may comprise causing, by the at least one processor, one or more of the game elements of the second type to be displayed on the display with a visual indication indicating that the respective game element is of the second type.

The method may comprise causing, by the at least one processor, one or more of the game elements of the second type to be displayed on the display with a visual indication to indicate a number of times the respective game element of the second type has been triggered.

The method may comprise causing, by the at least one processor, one or more of the game element of the second type with a visual indication to indicate a remaining number of times the respective game element of the second type can be triggered.

The method may comprise updating, by the at least one processor, a count value associated with a respective game element of the second type when that respective game element has been triggered.

The method may comprise comparing, by the at least one processor, the updated count value to a threshold value to determine when a respective game element of the first type has been triggered the plurality of times.

One or more of the game elements of the second type may be provided with a fixed position on the game board.

The method may comprise moving, by the at least one processor, a respective game element of the second type from one position of a subset of positions to another position of the subset of positions.

The method may comprise moving, by the at least one processor, a respective game element of the second type from one position of a subset of positions to another position of the subset of positions when a predefined condition is met.

The predefined condition may be determined to be met each time the user makes a move.

The method may comprise determining, by the at least one processor, when a respective game element of the second type has been triggered, which one or more other game elements are interacted with as a result of the triggering and determining a respective interaction for the one or more other game elements.

The method may comprise determining, by the at least one processor, which one or more other game elements are interacted with in dependence on one or more booster characteristics of the respective game element of the second type.

The method may comprise determining, by the at least one processor, which one or more other game elements are interacted with in dependence on one or more booster characteristics of the respective game element of the second type and one or more properties of the one or more other game elements.

The method may comprise causing, by the at least one processor, one or more of the plurality of game elements having the at least one common matching characteristic to be removed from the game board and causing the game board to be replenished with one or more game elements.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

According to another aspect, there is provided a non-transitory computer readable storage medium comprising computer executable instructions that, when executed by at least one processor of a computer device cause the computer device to be configured to provide a computer implemented game, the computer executable instructions when executed causing the computer device to: display, on a display of the computer device, game elements on a game board of the computer implemented game, the game elements comprising a first type of game elements and a second type of game elements, each game element of the second type of game elements being associated with an effect which when triggered causes an interaction with at least one other game element on the game board, at least some of the game elements being associated with a respective matching characteristic; receive, by a user interface of the computer device, user input when the user engages with a game element when playing the computer implemented game; determine, by at least one processor of the computer device, in response to the received user input that a plurality of game elements having at least one common matching characteristic satisfy a match condition and that a first game element of the second type is triggered to provide the effect; determine, by the at least one processor, that the first game element of the second type has been triggered a plurality of times, and in response causing the game board to be updated such that the first game element of the second type is removed from the game board; and cause, by the at least one processor, the display to display the updated game board.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Some example embodiments will now be described by way of example only and with reference to the accompanying drawings in which:

FIGS. 5a to 5d show an example of game element of a second type;

FIGS. 6a to 6e show different examples of game elements of the second type;

DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement embodiments in a number of variations.

Figure 1:
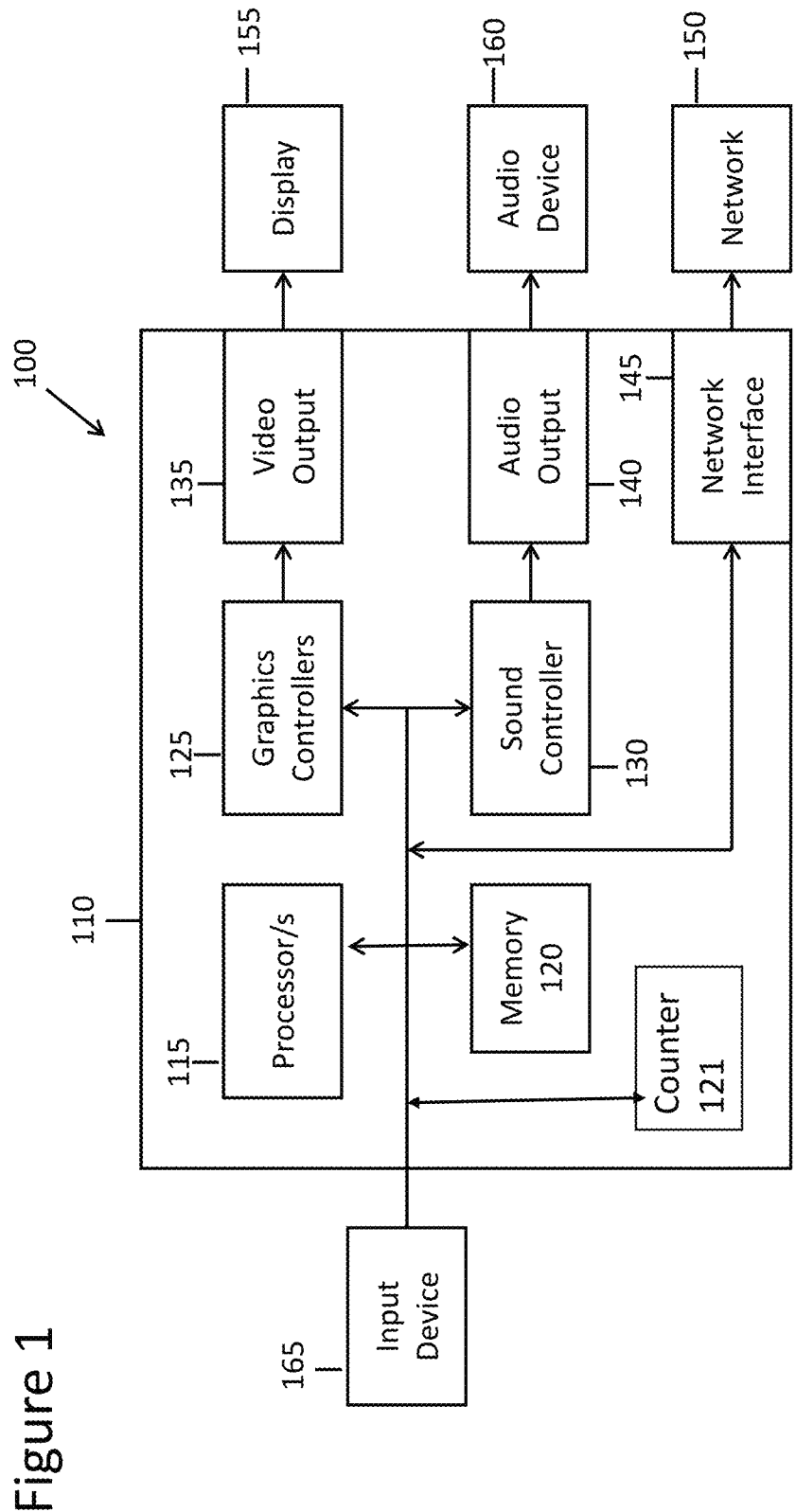
FIG. 1 shows an example user device in which some embodiments may be provided.

A schematic view of a user device 100 according to an embodiment is shown in FIG. 1. The user device may be configured to provide a computer implemented game such as described in more detail later. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio output 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example. The blocks of the controller 110 are configured to communicate with each other by an interconnect such as a bus or any other suitable interconnect and/or by point to point communication.

A counter 121 may be provided. The counter may be a hardware counter or a software counter or implemented by a combination of hardware and software. The counter may be a count up and/or a countdown counter. The counter may be controlled by at least one processor. The counter may be at least partially implemented by at least one processor. A count value of the counter may be stored in a data store. The count value stored in the data store may be updated each time the counter is incremented/decremented. The data store may be provided by the at least one memory.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 2:
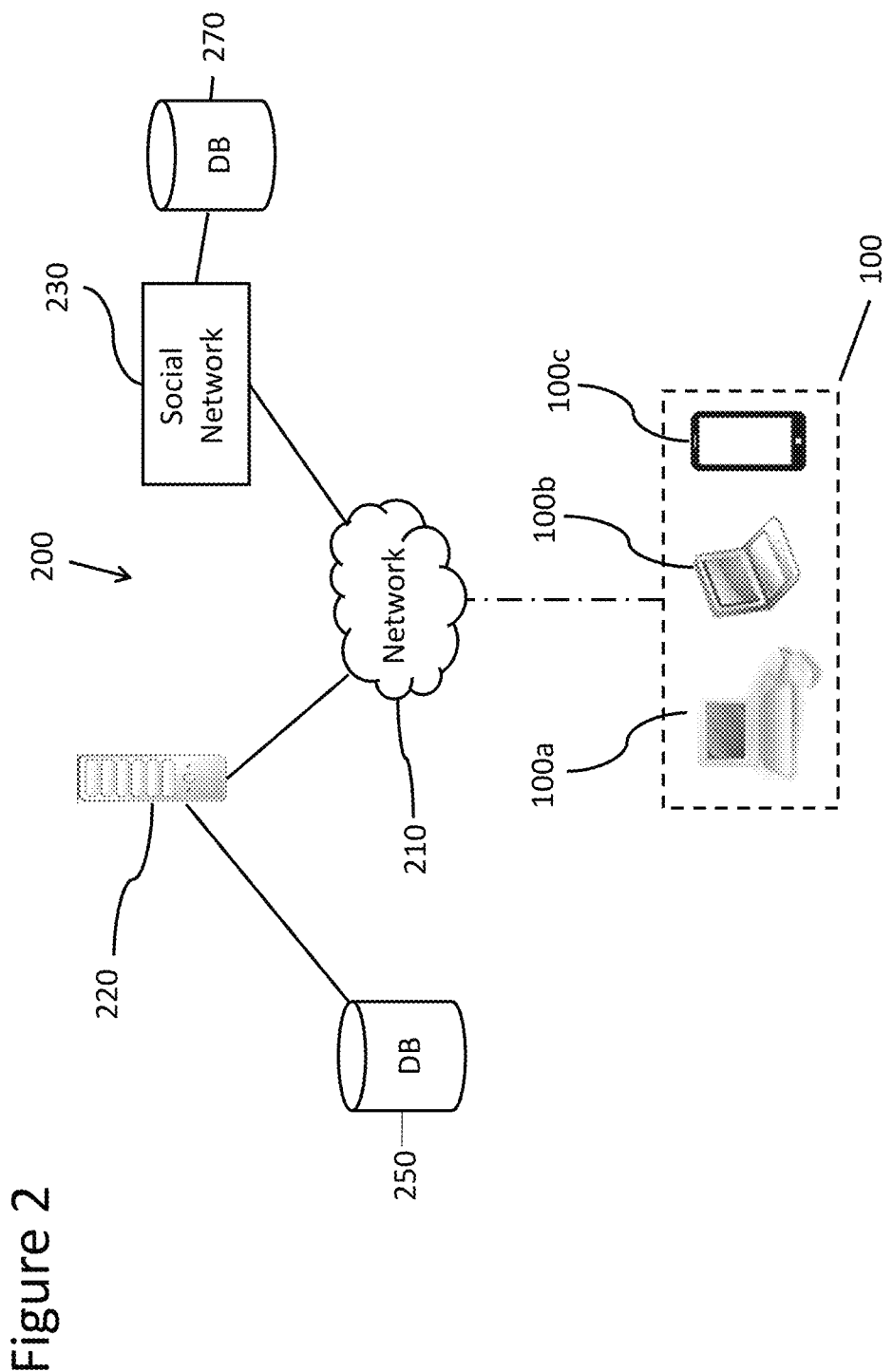
FIG. 2 shows an example system in which some embodiments may be provided.

FIG. 2 schematically shows a system 200 according to an embodiment. The system 200 comprises a server 220 which may store or be in communication with a database 250 which may store game player's details, profiles, statistics etc. In practice, one or more databases 250 may be provided. Where more than one server 220 is provided, the database(s) 250 may be provided in one server 220 or across two or more servers. The server 220 may also have a games data function. This may comprise one or more units of memory to store the computer game program, user behaviour data and a processor to run the games program and process the user behaviour data.

The server 220 may communicate via, for instance, the internet or other network 210 with one or more client or user devices 100, such as the user device 100 shown in FIG. 1 by way of example. The server 220 may have connections to a social network 230, for example, Facebook™. The connections may be via the network or via a direct connection. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the memory of the user device and is run on the processor of the user device. However, the server 220 may handle some elements of the game in some embodiments. By way of example only, a Java game applet may be provided to the user device 100 and the locally running Java applet will generate, for example, the graphics, sounds, and user interaction for the game play on the user device. Some data may be fed back to the server to allow interaction with other players. The data which is fed back may alternatively or additionally allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 3A:
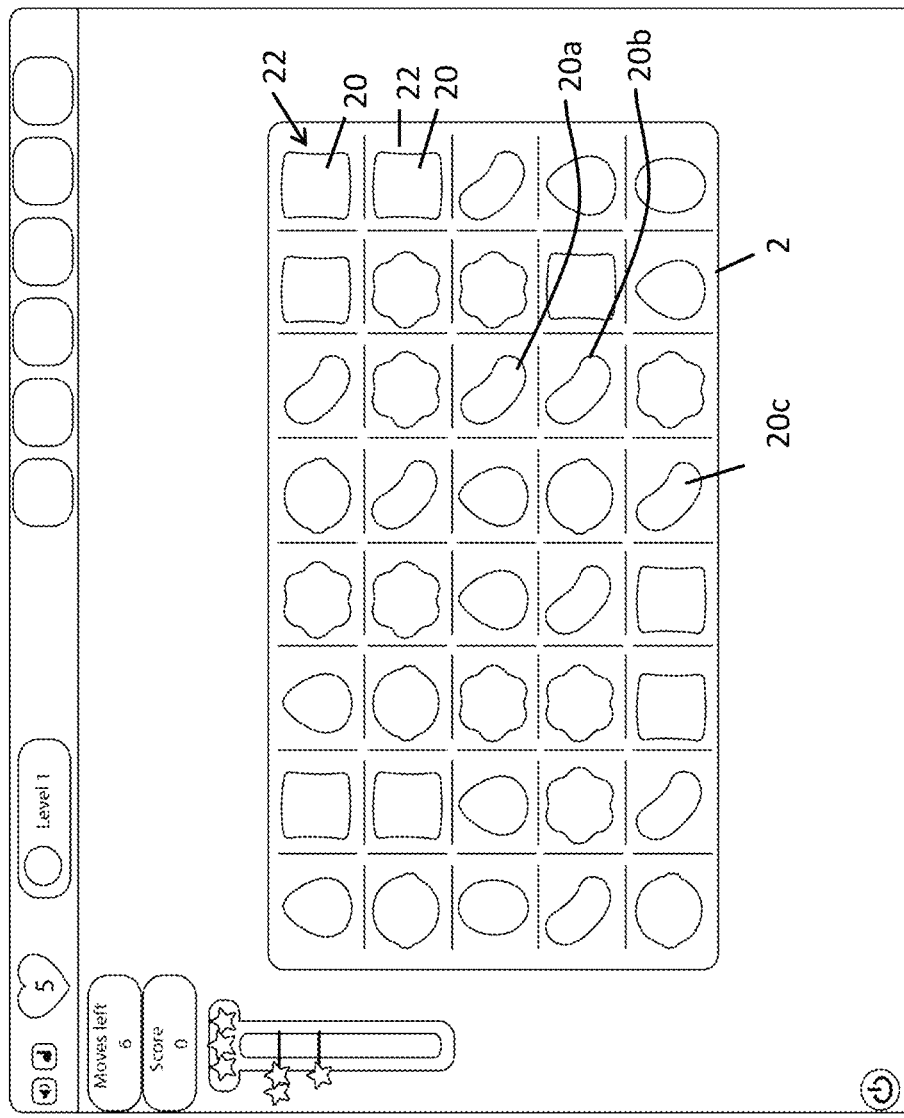
FIG. 3a is a schematic diagram of a game board of a match three game illustrating a basic example of a match three game of a computer implemented game.

FIG. 3a shows a display of a match 3 switcher game called Candy Crush Saga™ FIG. 3a illustrates a game board 2 with a plurality of game elements 20. The game elements are each of six different shapes and colours. Of course, in other embodiments, there may be more or less than six different game elements. Each game element type may be defined by one or more of particular matching characteristics, for example a particular shape and colour combination. Each game element is supported by a tile 22.

Figure 3B:
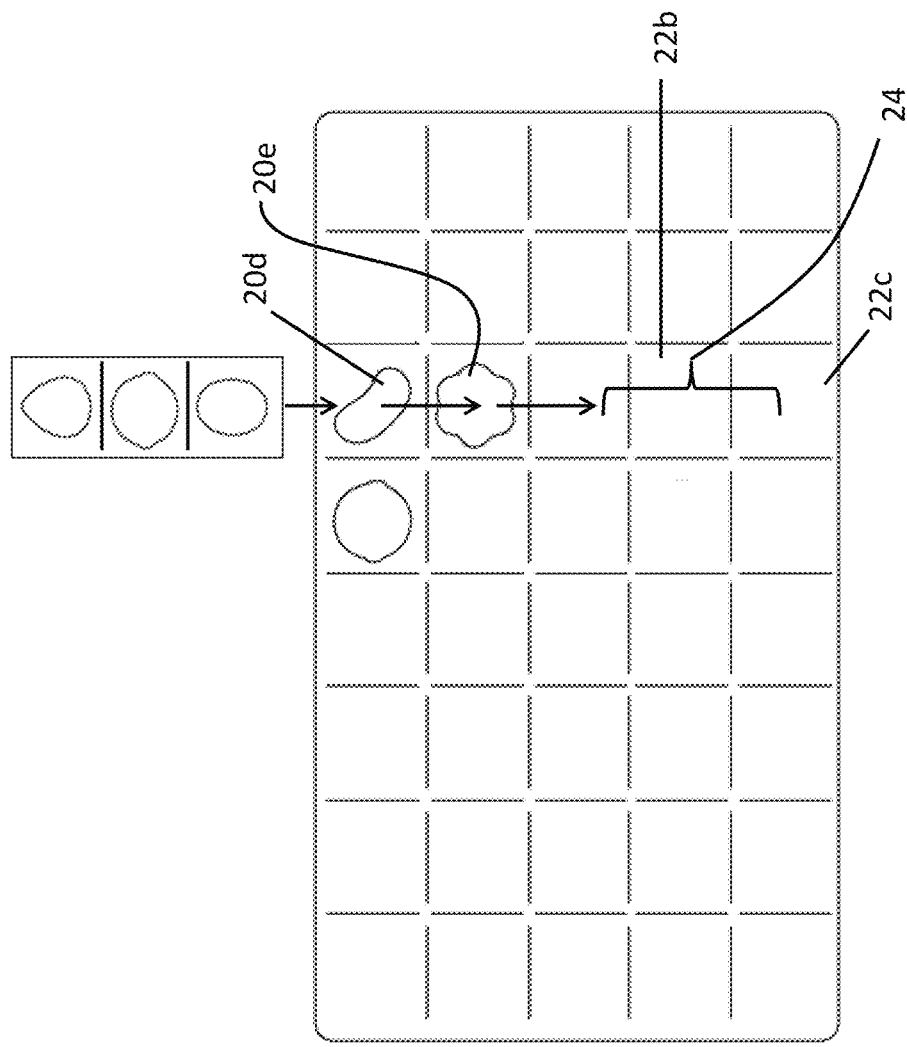
FIG. 3b is a schematic diagram illustrating how a game board is populated with replacement game elements.

In the known version of the match 3 switcher game, the aim of the game is to swap game elements in the shape of candies with each other to make moves on the game board. To gain points the player has to make moves that create matches of at least three game elements sharing a matching characteristic. In doing so, the player gains points and the game elements sharing the matching characteristic are removed. As a result, new game elements fall into place from the top of the game board in order to fill any spaces created. Assume in FIG. 3a that game element 20c is moved one place to the right to form a three-line match with game elements 20a and 20b. Turning now to FIG. 3b, this has the effect of game elements 20a, 20b and 20c being removed or "disappearing" from the game board, creating a visual effect (animation) on the screen to indicate the disappearance, such as a minimal explosion effect. The two game elements which were directly above game elements 20a will now fall downwards into the spaces created by the removal of game elements 20a, 20b and 20c. Thus, game element 20e will end up at the location 22c, and game element 20d will end up at the location 22b. In addition, three new game elements are provided and fall downwards into the game board to fill the remaining three spaces above location 22b. The new game elements may be generated at random. The user then has a new game board on which to play a subsequent move.

Game elements may drop down from the top of the game board. In an alternative version the physics can vary so that the speed and/or direction of replacement game elements can alter. For example, the game board may be filled from below and/or from the sides. It should be appreciated that any suitable mechanism may be used to replace game elements which are removed from the game board as a result of a match being made.

As will be described, embodiments may be used with a switcher game, such as discussed in relation to FIGS. 3a and 3b or any other suitable switcher game.

Other embodiments may be used with any other suitable games such as but not limited to linker games, clicker games and shooter games. The previously described games are by way of example only.

It should be appreciated that embodiments may be applied to any other suitable type of game of the matching genre.

Some embodiments may be applied to computer implemented games which have one or more levels. In some games, a user may be required to complete a certain level before the user is able to progress to a next level. In some games, the user may be able to go back and play any previous level. A game may have a number of different levels. A level may have one or more objectives to be met. The one or more objectives may need to be satisfied and/or met in order to complete the respective level. Different levels may be associated with one or more different objectives In some computer implemented games, the different levels may be represented on a map 400.

Figure 4:
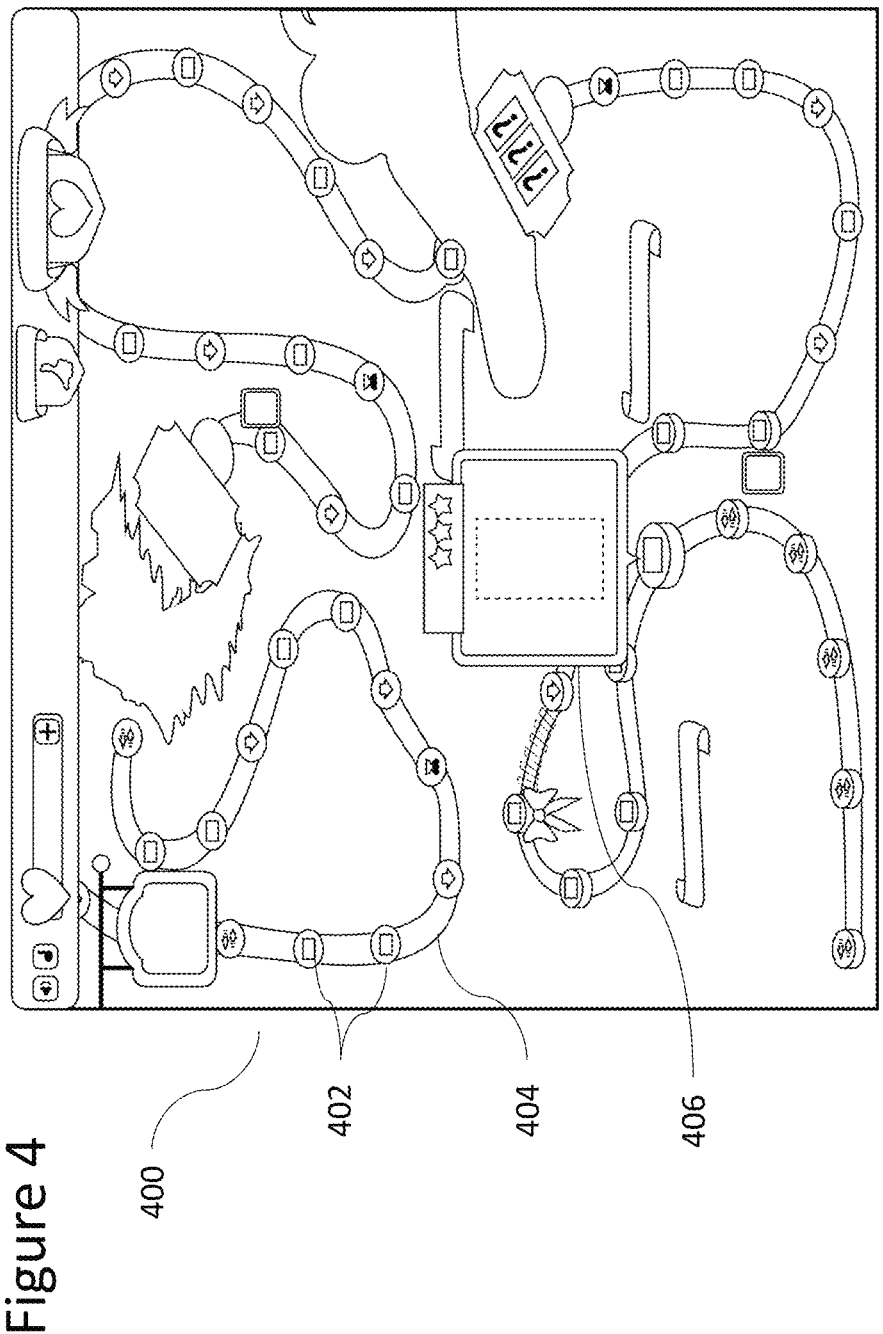
FIG. 4 schematically shows a representation of different levels of a game.

FIG. 4 schematically shows one example of such a view. Different levels 402 are represented on a path 404 so that the user can see the progress which he has made playing the game. The different levels may be displayed in a first manner and/or with first information if the level has not been completed and in a second manner and/or with second information if the level has been completed.

In some computer implemented games, if the player has connected to a social network, then friends' progress from the same network may be viewed on the map by the means of information provided next to the highest level they have currently reached or by virtual of a league table which can be displayed.

In the map view, the player can hover over a level to display a thumbnail 406 of it. This makes it easier to find specific already completed levels and can also give the player an idea of what to expect before actually starting a level.

As the player travels through the levels in the game, his progress may be represented as a journey along a path in the virtual map.

It should be appreciated that the map representation is only one way in which progress in a game may be shown. In other computer implemented games, for example, a list of levels may be provided with an indication of how far in the list the player has progressed.

In some computer implemented games, a plurality of different of different levels with different game modes may be provided. A given game mode may be associated with different game play rules and/or objectives.

In some computer implemented games, there may only be a single game mode.

In some computer implemented games, a given game mode may be associated with one or more different levels.

In some embodiments, the computer implemented game has a game board made up of game positions or tiles. Respective game elements are located on respective game positions or tiles.

In some embodiments, there may be a plurality of game elements of a first type provided on the game board and one or more game elements of a second type provided on the game board.

In some embodiments, the first type of game elements may be considered to include one or more of the following game elements: user selectable game elements having one or more matching characteristics and which do not provide a booster effect; booster game elements; and blocker game elements.

In some embodiments a tile may be associated with one or more blocker game elements.

In some embodiments, a blocker game element may be provided with one or more layers which need to be removed to reveal an underlying blocker game element, user selectable game element or booster game element.

In some embodiments, at least one game element of the second type of game elements may be a so-called static blocker game element. This means that the position of that game element with respect to the game board is unchanged even if, for example a removable game element located below (if the direction of replenishment is from above) that blocker is removed. The location of that game element of the second type will remain the same until the game is completed or one or more conditions for the removal of that game element are satisfied.

Alternatively or additionally, at least one game element of the second type of game elements may be able to move on the game board.

In some embodiments, one or more of the second type of game elements may be selected and moved by user input.

In some embodiments, at least one game element of the second type of game elements may be able to move between a given subset of positions on the game board. In some embodiments, the respective game element of the second type may move between the positions of the subset of positions. In some embodiments, when one or more conditions are satisfied, the respective game element will change its position from one position of the given subset of positions to another position of the subset of positions. In some embodiments, the condition may be that the user makes a move. In some embodiments, for each move made by the player, the respective game element will change its position from one position of the given subset of positions to another position of the subset of positions.

In some embodiments the given subset of positions may comprise two or three positions. In other embodiments, the number of positions in the given subset of positions may be more than three positions.

In some embodiments, at least one game element of the second type of game elements may be located on a tile of the game board and that tile may move between a given subset of positions on the game board. In some embodiments, the respective tile may move between these subset of positions. In some embodiments, for each move made by the player, the respective tile will change its position from one position of the given subset of positions to another position of the subset of positions.

Alternatively or additionally, at least one game element of the second type is able to move in the game board in the same way as described in relation to the game elements FIGS. 3a and b. For example, when game elements are removed, the game element of the second type will move down the game board if a game element below it (if the direction of replenishment is from above) is removed.

It should be appreciated that one or more additional or alternative directions of replenishment of game elements may be used in different embodiments which will influence the direction of movement of game elements which are able to move when one or more game elements are removed from the game board.

In some embodiments, at least one game element of the second type may be associated with a trigger condition. When the trigger condition is satisfied, the at least one game element of the second type is configured to provide an effect. This effect comprises an interaction with one or more other game elements on the game board. The effect provided when a given game element of the second type is triggered may be dependent on one or more characteristics of the respective game element of the second type. Optionally the effect provided may be dependent on one or more characteristics of the game element with which the respective game element of the second type interacts.

The respective game element of the second type when triggered may cause one or more of the following effects when interacting with a game element (the interacted game element) on the game board: removal of the interacted game element from the game board; changing of the interacted game element to a different game element; removal of one or more layers associated with the interacted game element; triggering an interacted game element of the second type; triggering of a booster game element; and any other suitable effect.

A game element of the second type may be triggered a plurality of times. Each time the game element of the second type is triggered, the associated effect is provided.

In some embodiments, the game element of the second type may triggered to provide the effect only once in a move. The game element of the second type may be triggered in different moves.

In other embodiments, the game element of the second type may be triggered to provide the effect more than once in a move.

In some embodiments, once the game element of the second type has been triggered the plurality of times, that game element of the second type is removed from the game board.

In some embodiments, the game element of the second type may be removed when the game element has been triggered n times. n may be 2 or more. In some embodiments, the game element of the second type may be removed from the game board when triggered four times.

In some embodiments, all game elements of the second type may be triggered up to n times, where n is the same for all game elements of the second type. In other embodiments, one or more game elements of the second type may be associated with a different value of n as compared to one or more different game elements of the second type.

In some embodiments, one or more game elements of the second type may be displayed with information indicating the number of times that the game element has been triggered and/or information indicating the remaining number of time that the game element can be triggered.

A game element of the second type may be triggered by one or more of the following ways: a match is made adjacent the game element of the second type; the game element of the second type is triggered by another game element of the second type; the game element of the second type is triggered by a booster game element.

Reference is made to FIG. 6a to d which show some examples of game elements of the second type. In some embodiments, a visual indication is provided to indicate that the game element is of the second type. In some embodiments, this visual indication comprises a covering 603a over the game element of the second type and/or a frame around the game element of the second type and/or any other suitable visual indication. The covering 603a is such that the second game element is still visible under the covering.

In some embodiments, the game elements of the second type when triggered may provide an effect on the game board which is the same or similar to that provided by one or more booster game elements when triggered.

Booster game elements when triggered will cause an interaction with one or more other game elements. A booster game element may be triggered once and when triggered is removed from the game board. A booster game element may move on the game board in a similar manner described in relation to game elements described in relation to FIGS. 3a and 3b. A booster game element may be selected and moved by user input received via the user interface. The booster game element may be triggered by making a match including the booster game element. Alternatively or additionally a booster game element may be triggered by the interaction from one or more other booster game elements or an interaction from a game element of the second type. It may be necessary to interact with a booster game element m times before the booster effect is provided where m is 1 or more. However, the booster effect itself is only provided once and then the booster game element is removed from the game board.

The booster game element may cause one or more other game elements to be removed and/or to change one or more other game elements to another game element and/or cause one or more objects to be removed from the game board and/or cause one or more objects to change. The one more objects removed may be associated with a game element or not associated with a game element. In some embodiments, where one or more objects are associated with a game element, the removal of one or more game objects may allow an associated game element to be used in game play. Alternatively or additionally, an object may be a tile background or the like which may be changed when one or more game booster is triggered.

It should be appreciated a respective game element of the second type may correspond to a respective game booster element in terms of the provided effect on other game elements on the game board when triggered. In other embodiments, there may be no overlap or only partial overlap between the effect on other game elements on the game board provided by game elements of the second type and the booster game elements.

Generally the booster effect is provided a plurality of times for a respective game element of the second type before the respective game element of the second type is removed from the game board. In contrast the booster effect is provided once by a booster game element before the booster game element is removed from the game board.

In some embodiments, one or more of the game elements of the second type may be associated with one or more matching characteristics. In some embodiments, one or more game elements of the second type may not be associated with a particular matching characteristic.

One or more booster game elements may be associated with one or more matching characteristics. In some embodiments, one or more booster game elements may not be associated with a particular matching characteristic.

In the example shown in FIG. 6a, the game element of the second type provides an effect corresponding to the so-called wrapped candy booster 600. This game element when triggered will interact with game elements surrounding the location of the wrapped candy game element.

In the example shown in FIG. 6b, the game element of the second type provides an effect corresponding to the so-called colour bomb booster 601. This game element when triggered will cause game elements of a given matching characteristic to be removed from the game board. In some embodiments, the given matching characteristic is dependent on the matching characteristic associated with the triggering game element which triggered that game element of the second type. In other embodiments, the given characteristic may be selected based on any other suitable criteria or at random.

FIG. 6c and FIG. 6d shown an example of a game element of the second type provides an effect corresponding to the so-called horizontal line or row blaster 602. This game element when triggered will interact with game elements in a given row of the game board. This may be the row in which the game element of the second type is located.

FIGS. 6c and 6d show one modification of some embodiments. This modification can be used with any one or more or all or none of the game elements of the second type. In this modification, before the game element of the second type can be triggered to provide an effect, one or more conditions first need to be satisfied. This may require one or more interactions with the game element of the second type to first occur. These required one or more interactions would not trigger the interaction provided by the game element of the second type. As shown in FIG. 6c, the game element of the second type when it cannot be triggered to provide an interaction is shown in a visually distinct manner as compared to when it can be triggered to provide an interaction, which is shown in FIG. 6d. The visual indication may comprise a greater semi opaque covering 603b over the game element of the second type. As can be seen, in FIG. 6c, the game element is visible under the semi opaque covering 603b but less visible than under the covering 603a shown in the representation of FIG. 6d.

Alternatively or additionally a game element of the second type may provide an effect corresponding to the so-called vertical line or column blaster. This game element when triggered will interact with game elements in a given column of the game board. This may be the column in which the game element of the second type is located.

Alternatively or additionally a game element of the second type may provide an effect corresponding to the so-called fish booster. This game element when triggered will target one or more game elements on the game board for interaction. This targeted game element or game elements may be selected at random, from one or more game elements having a given characteristic or from given type of game elements. For example, the targeted game element may be a blocker game element. The blocker game element may have a fixed position on the game board. The fish booster may aim to provide an effect which is considered to be helpful to the player.

Reference is made to FIGS. 5a to 5c which shows a different example of the visual representation of the game element of the second type. In this example, the game element of the second type 500 provides an effect corresponding to the row blaster 500t. A different visual representation is used in this example to indicate that the game element is of the second type. In this example the game element of the second type is surrounded by a frame. In this example, the visual appearance of the frame will vary in dependence on the number of the times the game element of the second type has been triggered.

In the example shown in FIG. 5a, the appearance 501a of the frame is such that the frame is of a uniform appearance. This indicates that the game element of the second type has yet to be triggered.

In the example shown in FIG. 5b, the appearance 501b of the frame is such that the frame has a quarter of the frame represented in one way and three quarters of the frame represented in a different way. For example the one way may be to show the frame in a darker appearance and the different way may be to show the frame with a lighter appearance (or vice versa). This indicates that the game element has been triggered once.

In the example shown in FIG. 5c, the appearance 501c of the frame is such that the frame has a half of the frame represented in the one way and a half of the frame represented in the different way. This indicates that the game element has been triggered twice.

In the example shown in FIG. 5d, the appearance 501d of the frame is such that the frame has three quarters of the frame represented in the one way and a quarter of the frame represented in the different way. This indicates that the game element has been triggered three times.

In some embodiments, when the second game element of FIG. 5d is triggered, then the game element is removed.

Reference is made to FIG. 6e which shows a game element of the second type (providing an effect corresponding to the wrapped candy booster). The visual indication provided to indicate that the game element is of the second type comprises the covering over the game element of the second type as discussed in relation to FIGS. 6a to d in combination with a frame 604 such as described in relation to FIG. 5.

Figure 7:
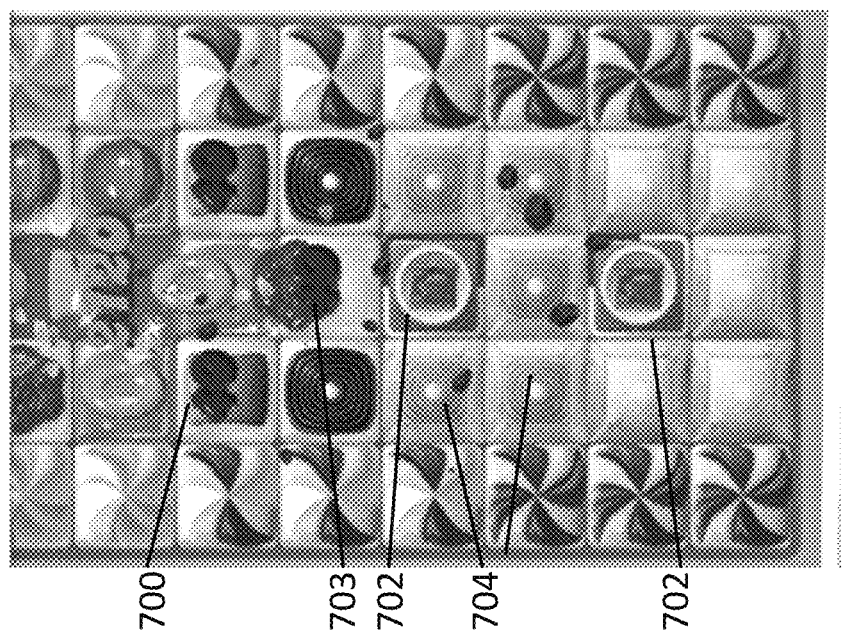
FIG. 7 shows a first example of a game board of some embodiments with game elements of the second type.

Reference is made to FIG. 7 which shows an example game board 700 of the computer implemented game. On the game board are a plurality of game elements of the second type 702. In this example, the game elements 702 are provided in an area of the game board surrounded by a plurality of game elements 704. These game elements 704 need to be interacted with one or more times before the underlying blocker game element is revealed and can be removed from the game board. This may be visually represented by providing one or more layers over the respective blocker game element which are removed each time an interaction with that game element occurs until the underlying blocker game element is revealed.

In this example, the game element of the second type 702 provides an effect corresponding to the wrapped candy booster. Each time that game element of the second type is triggered, it will interact with the surrounding game elements. In the example shown in FIG. 7, the game elements of the second type are surrounded by game elements of the first type. These game elements of the first type include blocker game elements. In this example, when the game element of the second type is triggered, this will cause a layer of the respective blocker game element to be removed or the blocker game element to be removed if it has been revealed. In the example of FIG. 7, there is also a game element 703 (which is not a blocker game element or booster game element) of the first type which will be removed when the second game element is triggered. A booster game element if present would be triggered by the game element of the second type.

Figure 8:
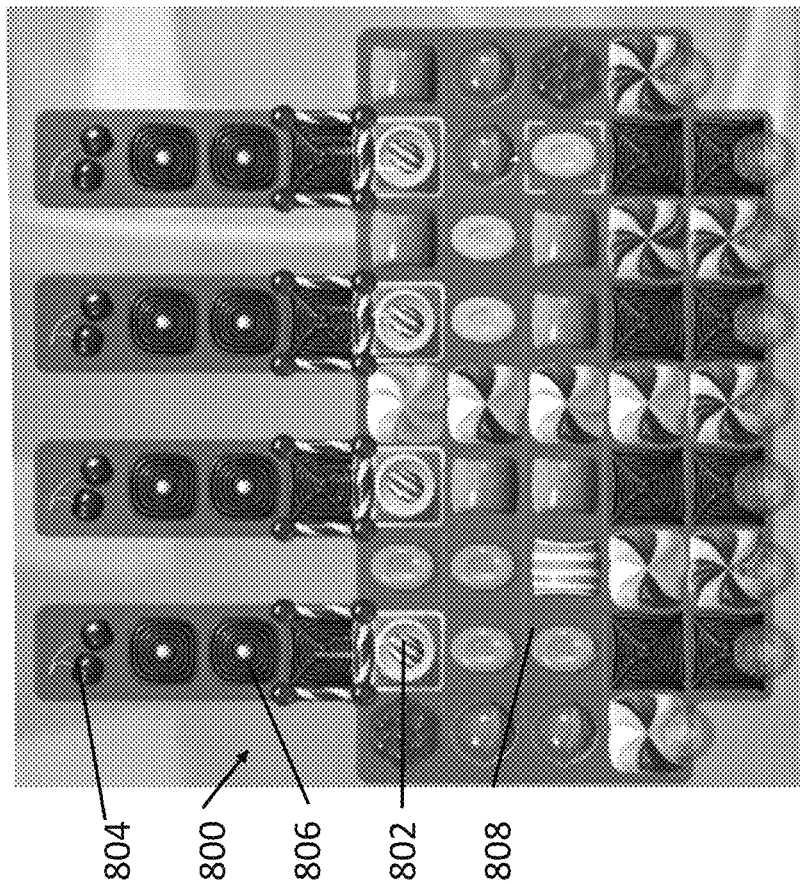
FIG. 8 shows a second example of a game board of some embodiments with game elements of the second type.

Reference is made to FIG. 8 which shows an example game board 800 of the computer implemented game. On the game board are a plurality of game elements of the second type 802. In this example, an objective associated with completion of this level or game is to bring one or more objects 804 (or ingredient) from the top of the game board to the bottom of the game board. Between a respective object 804 and the respective game element of the second type are one or more blocker game elements 806. The blocker game element will prevent the object 804 from moving and thus need to be removed. A respective blocker game element will be removed after one or more interactions from a respective game element of the second type. In this example, the game element of the second type may provide an effect corresponding to a column blaster booster. The second game element therefore needs to be triggered a given number of times to cause the blocker game element(s) to be removed. The second game element further needs to be removed after being triggered the threshold number of times. Once the one or more blocker game elements 806 and the respective game element 802 of the second type have been removed, the object is able to move into a main part 808 of the game board.

Figure 9:
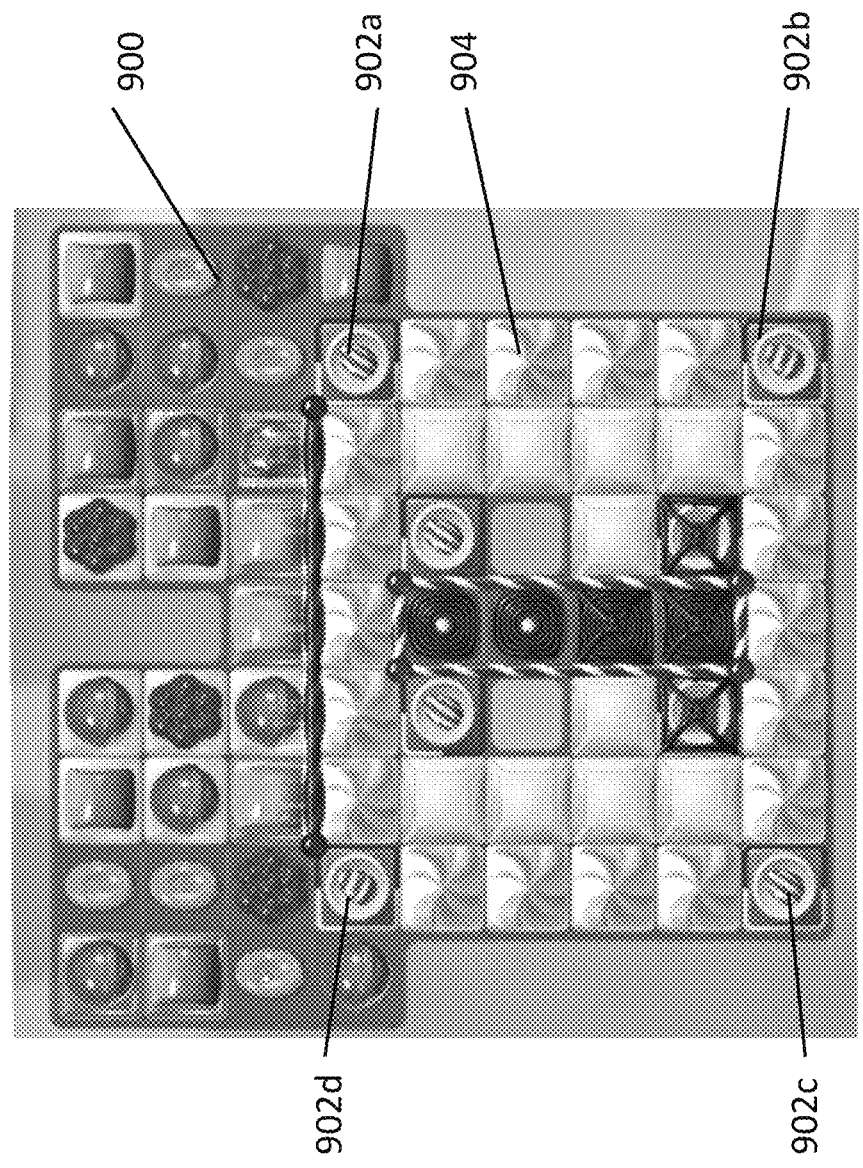
FIG. 9 shows a third example of a game board of some embodiments with game elements of the second type.

Reference is made to FIG. 9 which shows an example game board 900 of the computer implemented game. On the game board are a plurality of game elements of the second type 902a to d. In this example, the game elements 902a to d are provided in an area of the game board with a plurality of game elements 904. These game elements 904 need to be interacted with one or more times before the underlying blocker game element is revealed and can be removed from the game board as previously described. This may be visually represented as discussed in relation to game elements 704. In this example, the game elements 902a and c of the second type provide an effect corresponding to a column booster and the game elements 902b and d of the second type provide an effect corresponding to a row booster. These game elements are arranged such that game element 902a is arranged in the same row as game element 902d and in the same column as game element 902b. Game element 902c is arranged in the same row as game element 902b and in the same column as game element 902d. In other words these game elements are arranged at corners of a rectangle or square. The game elements of the second type in this arrangement are such that when one of the four game elements 902a to d of the second type is triggered, this will in turn trigger another of the game elements of the second type and so on until each of the four game elements has been triggered. In some embodiments, each game element of the second type is only triggered once in a turn or move of the player.

Figure 10:
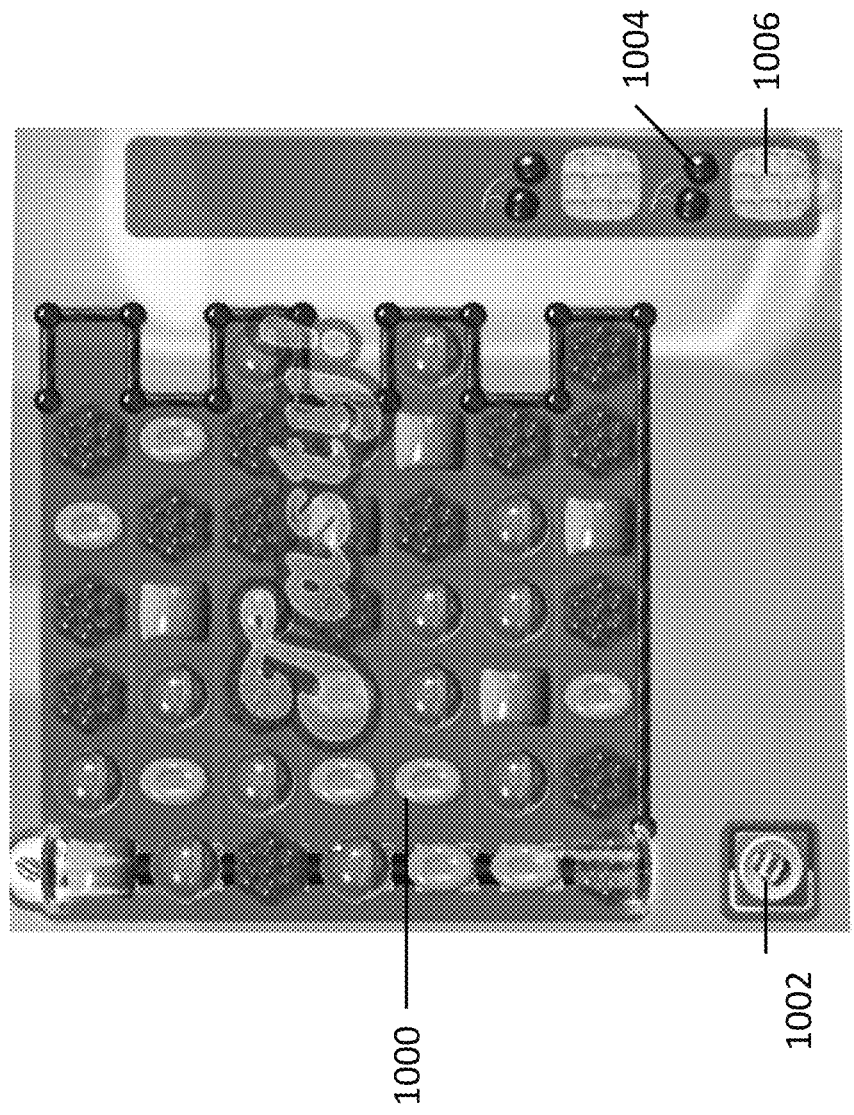
FIG. 10 shows a fourth example of a game board of some embodiments with game elements of the second type.

Reference is made to FIG. 10 which shows an example game board 1000 of the computer implemented game. On the game board are a plurality of game elements of the second type 1002. In this example, an aim is to bring an object 1004 (or ingredient) from the top of the game board to the bottom of the game board. Between an object 1004 and the bottom of the game board are one or more blocker game elements 1006. The blocker game element will prevent the object from moving and thus need to be removed. In this example, the one or more objects and the one or more blocker game elements are located in an isolated part of the game board where there are no game elements which can be selected by a user. The respective blocker game element can be removed in this example after one or more interactions from the game element of the second type and/or potentially a booster game element. The game element of the second type 1002 is not located in the same part of the game board as the blocker game element(s) and object(s) and is provided in its own isolated location. In this example, the game element of the second type may be triggered to provide a row blaster booster effect which interacts with the blocker game element. The game element 1002 which is provided in its isolated part of the game board cannot be triggered by a match occurring adjacent to that game element of the second type. However, that game element of the second type may be triggered as a result of an interaction from another game element of the second type or a booster. The game element 1002 of the second type therefore needs to be triggered a given number of times to cause the blocker game element(s) to be removed. Once the one or more blocker game elements have been removed, the one or more object can be collected.

Figure 11:
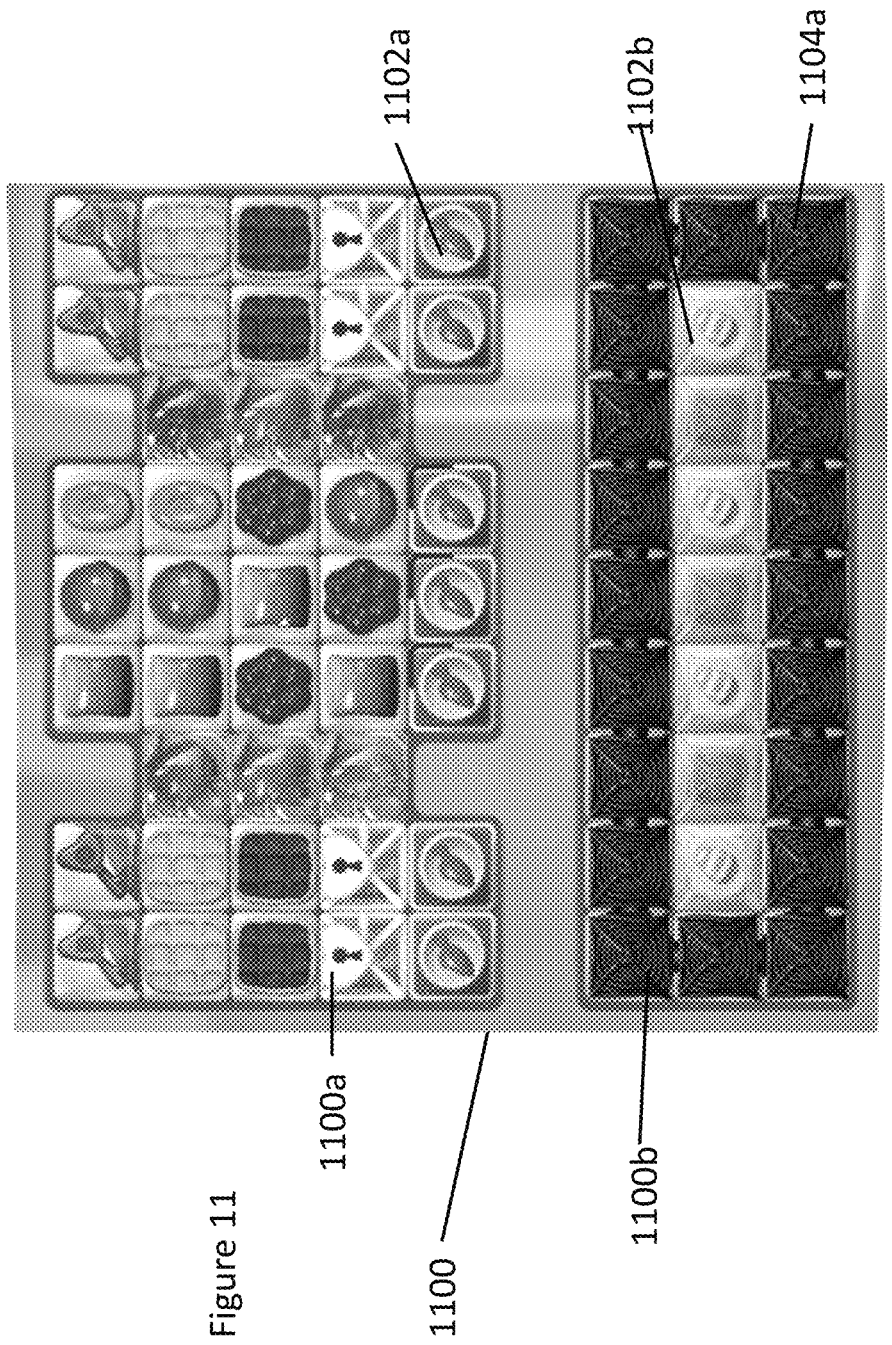
FIG. 11 shows a fifth example of a game board of some embodiments with game elements of the second type.

Reference is made to FIG. 11 which shows an example game board 1100 of the computer implemented game. The game board has a first part 1100a and a second part 1100b. The second part 1100b initially does not have any game element which can be selected and moved by the user. This is because at the game elements are either the game elements of the second type 1102b which have a fixed position or are blocker game elements 1104a which require one or more interactions before the blocker game element can be removed from the game board. The game elements of the second type provide an effect corresponding to a wrapped candy booster or a row blaster booster. The second game elements are arranged such that when one of the game elements of the second type is activated, this will cause the other game elements of the second type in the second part of the game board to be activated.

The game elements 1102a of the second type in the first part are associated with fish booster. When a game element 1102a associated with a fish booster is triggered, this may cause a game element of the second type to be triggered in the second part of the game board.

Figure 12:
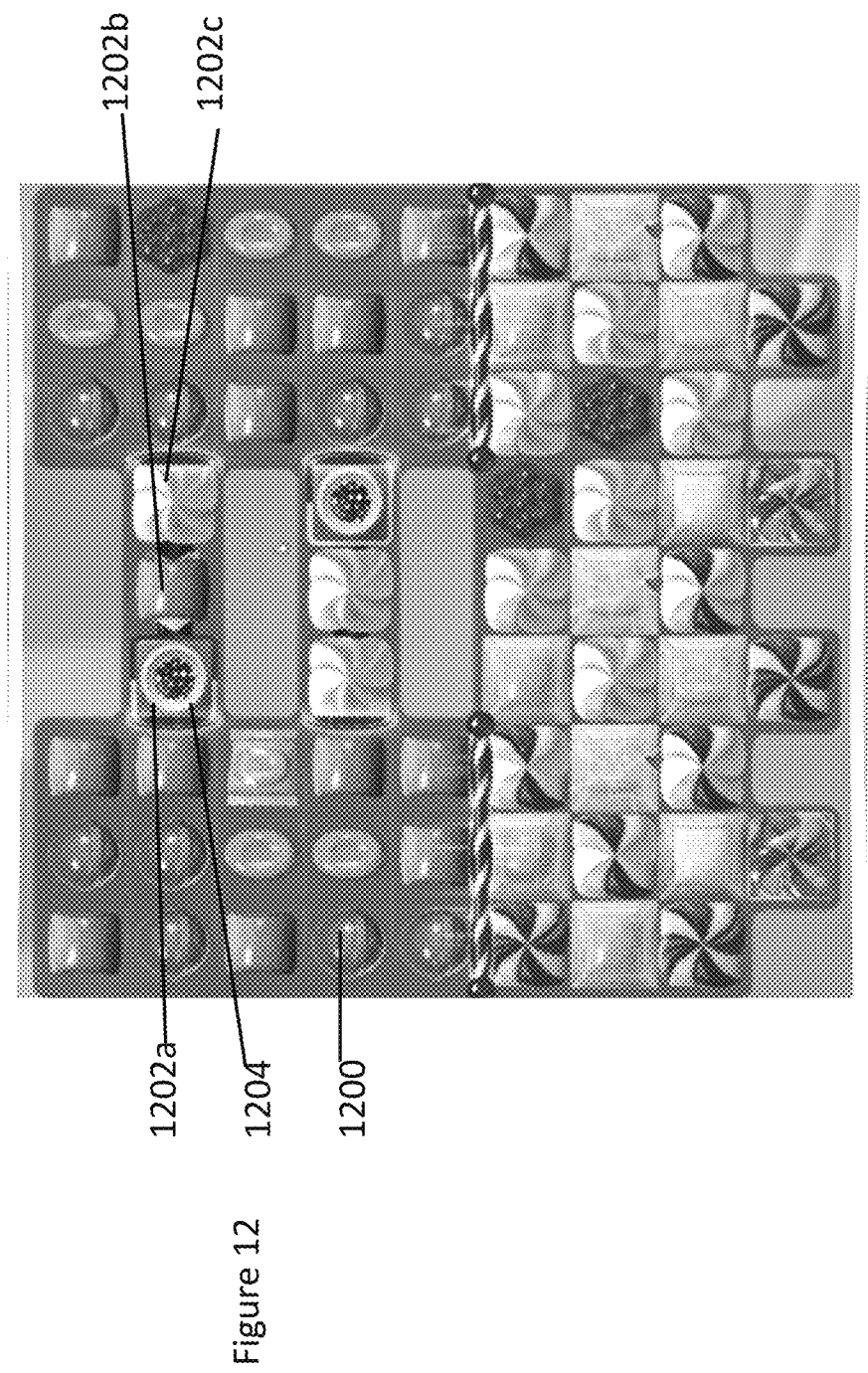
FIG. 12 shows a sixth example of a game board of some embodiments with game elements of the second type.

Reference is made to FIG. 12 which shows an example game board 1200 of the computer implemented game. In this example, there are a set of positions 1202a, b and c provided on the game board. The set of positions 1202a, b and c may provide a so-called conveyer belt. A game element of the second type 1204 is provided on the conveyor belt. Each time the user makes a move the game element 1204 moves one position in the set of positions. In the example, there are three positions. The game element will move from the first position 1202a to the second position 1202b to the third position 1202c to the first position 1202a and so on.

In this example, the game elements of the second type are associated with a colour bomb booster.

Figure 13:
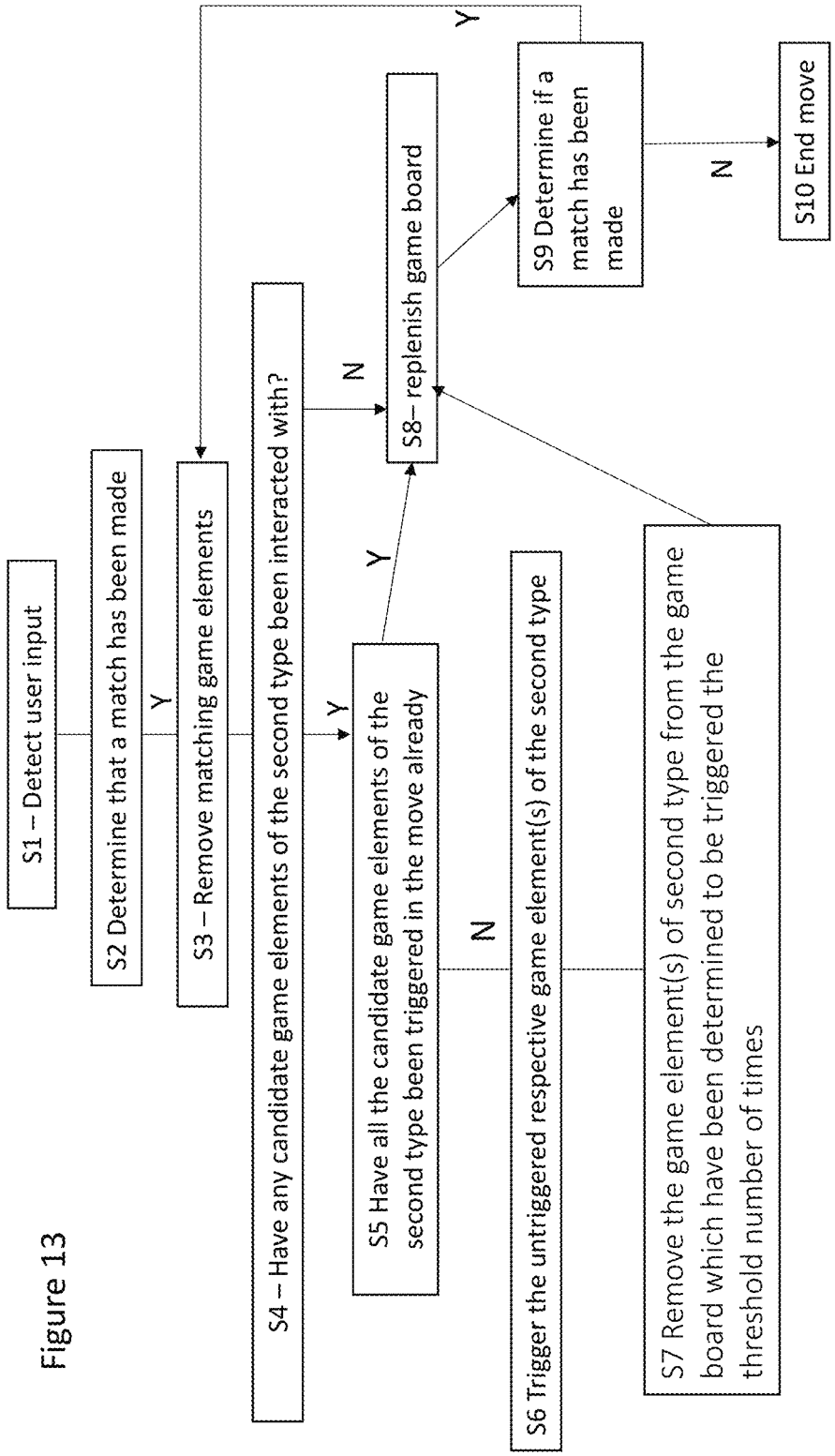
FIG. 13 shows a first method of some embodiments.

Reference is made to FIG. 13 which shows a first method according to an embodiment. The method may be performed by at least one processor in conjunction with at least one memory of the user device.

In step S1, user input is provided via the user interface. The user input may be to select a game element on the game board. This may be a game element of the first type. However, in other embodiments, the game elements which can be selected by user input may include one or more of the second type of game elements.

This user input may be user input interacting with the game board via the user interface (for example a touch screen on which a game board of game elements is displayed). The user input may be configured to cause the position of two game elements to be swapped to make a match. The user input may be to select a game element and move it so that is swaps position with another game element.

In step S2, the at least one processor may be configured to determine in response to this input that a match has been made. It should be appreciated that in some embodiments, the at least one processor may be configured such that an input from the user to select and move a game element is only permitted if that results in a match being made. A match may be determined to occur when at least a plurality of game elements share a common matching characteristic such as previously described.

In other embodiments, the user may be permitted to select and move a game element even if that does not result in a match being made.

In step S3, the at least one processor is configured to cause the matching game elements to be removed from the game board. The at least one processor may be configured to cause the display to display an indication that the matching game elements have been removed. This indication may comprise the removal of the matching game elements from the displayed game board and/or an animation indicating that the matching game elements are being removed from the game board.

In step S4, the at least one processor is configured to determine if there are any candidate game elements of the second type which have being interacted with in response to the match being made.

A candidate game element has been interacted with if: one or more of the matching game elements are located in a position on the game board adjacent to the respective candidate game element of the second type; and/or the respective candidate game element of the second type is at a location of the game board which is associated with a potential interaction with one or more triggered booster game elements or another game element of the second type.

If is determined that the no candidate game elements of the second type which have been interacted with, then the next step is step S8 in which the game board is replenished.

If it is determined that there are one or more candidate game elements of the second type which have been interacted with, then the next step is step is step S5. In step S5, it is determined by the at least one processor if all the candidate game elements of the second type which have been interacted with have all been triggered in the current move.

If all of the candidate game elements of the second type, which have been interacted with, have already been triggered in the current move, then the next step is step S8 in which the game board is replenished.

If one or more of the candidate game elements of the second type, which have been interacted with, have not already been triggered in the current move, then the next step is step S6. In step S6, the at least one processor is configured to cause the or each candidate game element of the second type, which have been interacted with, and which have not previously been triggered in the current move to be triggered.

In step S7, the at least one processor is configured to remove a respective game element of the second type if that game element has been determined to have been triggered a threshold number of times. The at least one processor may be configured to determine for the or each game element of the second type which has been triggered if the respective game element of the second type has been triggered a threshold number of times.

The at least one processor may be configured to cause the display to display an indication that the respective game element of the second type has been removed from the game board. For example, the respective game element of the second type may be removed from the game board.

Step S7 is followed by step S8 in which the game board is replenished. After step S8, the next step is step S9.

In step S9, the at least one processor is configured to determine if one or more matches has been made as a result of the replenishment. When it is determined in step S9 that there are no matches remaining on the game board and/or that no conditions are satisfied for the triggering of one or more game elements of the second type and/or no conditions are satisfied for the triggering of one or more boosters on the game board, the next step is step s10. In step S10, the move ends.

If there are still available moves, the user can provide input to provide another move and the method of FIG. 13 may be repeated.

Figure 14:
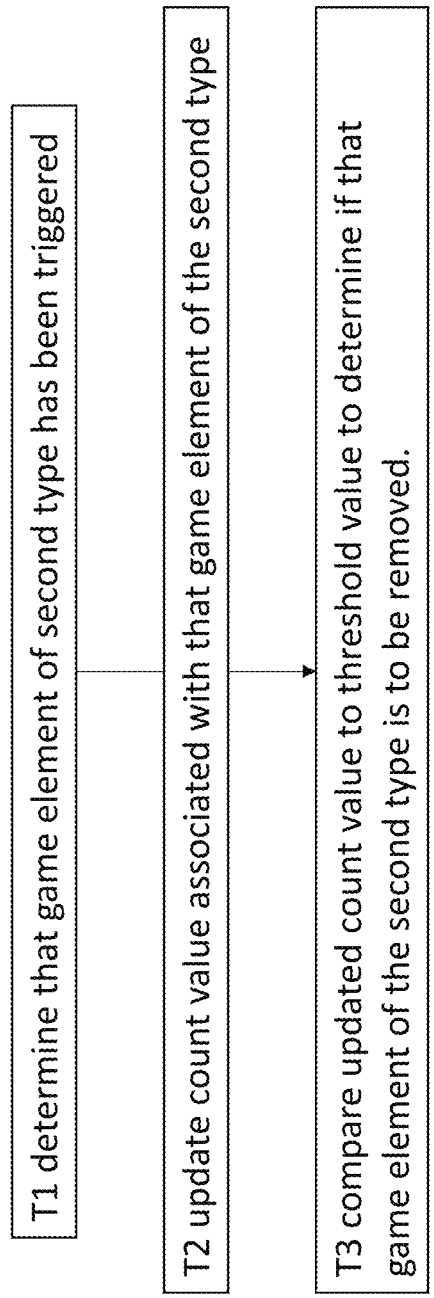
FIG. 14 shows a second method of some embodiments.

Reference is made to FIG. 14 which shows a method of some embodiments.

In step T1, it is determined by the at least one processor that a given game element of the second type has been triggered.

In step T2, the at least one processor is configured to update a count value associated with given game element. This may be to increment a count value or to decrement a count value depending on if the counter is a count up counter or a count down counter.

In step T3, the at least one processor is configured to compare the updated count value to a threshold count value to determine if that game element of the second type is to be removed from the game board. Where the count value is decremented, the threshold value may be zero. Where the count value is incremented, the threshold value may be the number of times the given game element of the second type can be triggered before being removed from the game board.

It should be appreciated that two or more of the example game boards shown in FIGS. 7 to 12 may represent different levels in the same computer implemented game and/or one or more of the example game boards shown in FIGS. 7 to 12 may be provided in different computer implemented games.

It should be appreciated that the visual indication indicating that the game element is of the second type can take any suitable form and may differ from the previously described alternatives.

It should be appreciated that the visual indication indicating the number of times that a game element of the second type has been triggered and/or the number of remaining times that the game element of the second type can be triggered may be displayed in any suitable way. For example, a number indication may be used. The number indication may indicate the total number of times the game element of the second type can be triggered and/or the number of times that a game element of the second type has been triggered and/or the number of remaining times that the game element of the second type can be triggered. In other embodiments, this information may be represented by a health bar.

As can be seen from FIGS. 7 to 12, the game element of the second type can be used in a number of different ways to create a diverse range of levels.

Some example embodiments may provide methods for introducing complexity into computer implemented games. This may be particularly challenging when considering small screen devices, where complex game arrangements may be difficult to display due to the limitations imposed by the devices in terms of processing capability and display size. The game element of the second type of some example embodiments may allow strategic diversity in gameplay, and therefore introduce a further level of complexity to the computer implemented game, without placing undue burden on processing or display requirements. As such, some embodiments may also drive user engagement with the computer implemented game by making the game more complex and challenging.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer device configured to provide a computer implemented game, the computer device comprising:
   a display configured to display game elements on a game board of the computer implemented game, the game elements comprising a first type of game elements and a second type of game elements, each game element of the second type of game elements being associated with an effect which when triggered causes an interaction with at least one other game element on the game board, at least some of the game elements being associated with a respective matching characteristic;
   a user interface configured to receive user input when the user engages with a game element when playing the computer implemented game; and
   at least one processor configured to:
      determine, in response to the received user input, that a plurality of game elements having at least one common matching characteristic satisfy a match condition and that a first game element of the second type is triggered to provide the effect;
      determine that the first game element of the second type has been triggered a plurality of times, and in response causing the game board to be updated such that the first game element of the second type is removed from the game board; and
      causing the display to display the updated game board,
   the at least one processor further being configured to:
      determine, when the first game element of the second type has been triggered, which one or more other game elements are interacted with as a result of the triggering in dependence on one or more booster characteristics of the first game element of the second type and one or more properties of the one or more other game elements; and
      determine a respective interaction for the one or more other game elements.

2. The computer device as claimed in claim 1, wherein the user interface is configured to receive a plurality of user inputs, each user input engaging with a game element to provide a respective move of the computer implemented game, and the at least one processor is configured to control a respective game element of the second type to be triggered only once in a respective move of the computer implemented game.

3. The computer device as claimed in claim 1, wherein the at least one processor is configured to determine that a respective game element of the second type has been triggered in response to determining that a plurality of game elements having at least one common matching characteristic satisfy a match condition and one or more of the plurality of game elements is adjacent to the respective game element of the second type.

4. The computer device as claimed in claim 1, wherein the at least one processor is configured to determine that a respective game element of the second type has been triggered by an interaction caused by a triggering of another game element of the second type.

5. The computer device as claimed in claim 1, wherein the at least one processor is configured to cause one or more of the game elements of the second type to be displayed on the display with a visual indication indicating that the respective game element is of the second type.

6. The computer device as claimed in claim 1, wherein the at least one processor is configured to cause one or more of the game elements of the second type to be displayed on the display with a visual indication to indicate a number of times the respective game element of the second type has been triggered.

7. The computer device as claimed in claim 1, wherein the at least one processor is configured to cause one or more of the game element of the second type with a visual indication to indicate a remaining number of times the respective game element of the second type can be triggered.

8. The computer device as claimed in claim 1, wherein the at least one processor is configured to update a count value associated with a respective game element of the second type when that respective game element has been triggered.

9. The computer device as claimed in claim 8, wherein the at least one processor is configured to compare the updated count value to a threshold value to determine when a respective game element of the second type has been triggered the plurality of times.

10. The computer device as claimed in claim 1, wherein one or more of the game elements of the second type is provided with a fixed position on the game board.

11. The computer device as claimed in claim 1, wherein the at least one processor is configured to move a respective game element of the second type from one position of a subset of positions to another position of the subset of positions when a predefined condition is met.

12. The computer device as claimed in claim 1, wherein the at least one processor is configured to cause one or more of the plurality of game elements having the at least one common matching characteristic to be removed from the game board and to cause the game board to be replenished with one or more game elements.

13. A computer implemented method provided by a computer device configured to provide a computer implemented game, the method comprising:
   displaying, on a display of the computer device, game elements on a game board of the computer implemented game, the game elements comprising a first type of game elements and a second type of game elements, each game element of the second type of game elements being associated with an effect which when triggered causes an interaction with at least one other game element on the game board, at least some of the game elements being associated with a respective matching characteristic;

receiving, by a user interface of the computer device, user input when the user engages with a game element when playing the computer implemented game;

determining, by at least one processor of the computer device, in response to the received user input that a plurality of game elements having at least one common matching characteristic satisfy a match condition and that a first game element of the second type is triggered to provide the effect;

determining, by the at least one processor, that the first game element of the second type has been triggered a plurality of times, and in response causing the game board to be updated such that the first game element of the second type is removed from the game board; and causing, by the at least one processor, the display to display the updated game board, the method further comprising:

determining, when the first game element of the second type has been triggered, which one or more other game elements are interacted with as a result of the triggering in dependence on one or more booster characteristics of the first game element of the second type and one or more properties of the one or more other game elements; and determining a respective interaction for the one or more other game elements.

14. The method as claimed in claim 13, comprising receiving, by the user interface, a plurality of user inputs, each user input engaging with a game element to provide a respective move of the computer implemented game, and controlling, by the at least one processor, a respective game element of the second type to be triggered only once in a respective move of the computer implemented game.

15. The method as claimed in claim 13, comprising determining, by the at least one processor, that a respective game element of the second type has been triggered in response to determining that a plurality of game elements having at least one common matching characteristic satisfy a match condition and one or more of the plurality of game elements is adjacent to the respective game element of the second type.

16. The method as claimed in claim 13, comprising determining, by the at least one processor, that a respective game element of the second type has been triggered by an interaction caused by a triggering of another game element of the second type.

17. The method as claimed in claim 13, comprising causing, by the at least one processor, one or more of the game elements of the second type to be displayed on the display with a visual indication to indicate a number of times the respective game element of the second type has been triggered.

18. The method as claimed in claim 13, comprising updating, by the at least one processor, a count value associated with a respective game element of the second type when that respective game element has been triggered.

19. The method as claimed in claim 18, comprising comparing, by the at least one processor, the updated count value to a threshold value to determine when a respective game element of the second type has been triggered the plurality of times.

20. The method as claimed in claim 13, comprising moving, by the at least one processor, a respective game element of the second type from one position of a subset of positions to another position of the subset of positions when a predefined condition is met.

21. A non-transitory computer readable storage medium comprising computer executable instructions that, when executed by at least one processor of a computer device cause the computer device to be configured to provide a computer implemented game, the computer executable instructions when executed causing the computer device to:

display, on a display of the computer device, game elements on a game board of the computer implemented game, the game elements comprising a first type of game elements and a second type of game elements, each game element of the second type of game elements being associated with an effect which when triggered causes an interaction with at least one other game element on the game board, at least some of the game elements being associated with a respective matching characteristic;

receive, by a user interface of the computer device, user input when the user engages with a game element when playing the computer implemented game;

determine, by at least one processor of the computer device, in response to the received user input that a plurality of game elements having at least one common matching characteristic satisfy a match condition and that a first game element of the second type is triggered to provide the effect;

determine, by the at least one processor, that the first game element of the second type has been triggered a plurality of times, and in response causing the game board to be updated such that the first game element of the second type is removed from the game board; and cause, by the at least one processor, the display to display the updated game board, the computer executable instructions when executed further causing the computer device to:

determine by the at least one processor, when the first game element of the second type has been triggered, which one or more other game elements are interacted with as a result of the triggering in dependence on one or more booster characteristics of the first game element of the second type and one or more properties of the one or more other game elements; and determine, by the at least one processor, a respective interaction for the one or more other game elements.

* * * * *